(12) United States Patent
Seebauer et al.

(10) Patent No.: US 8,221,708 B2
(45) Date of Patent: Jul. 17, 2012

(54) TUBE BUNDLE FALLING FILM MICROREACTOR FOR PERFORMING GAS LIQUID REACTIONS

(75) Inventors: Florian Seebauer, Wels (AT); Peter Poechlauer, Linz (AT); Sascha Braune, Luftenburg an der Donau (AT); Stefan Steinhofer, Gurten (AT)

(73) Assignee: DSM Fine Chemicals Austria NFG GmbH & Co KG, Linz (AT)

( * ) Notice: Subject to any disclaimer, the term of this patent is extended or adjusted under 35 U.S.C. 154(b) by 130 days.

(21) Appl. No.: 12/600,513

(22) PCT Filed: May 29, 2008

(86) PCT No.: PCT/EP2008/056584
§ 371 (c)(1),
(2), (4) Date: Jan. 14, 2010

(87) PCT Pub. No.: WO2008/145683
PCT Pub. Date: Dec. 4, 2008

(65) Prior Publication Data
US 2010/0152479 A1 Jun. 17, 2010

(30) Foreign Application Priority Data
Jun. 1, 2007 (AT) .................................. A 868/2007

(51) Int. Cl.
*B01J 10/02* (2006.01)
(52) U.S. Cl. ........................................ 422/651; 422/603
(58) Field of Classification Search .................. 422/603, 422/651
See application file for complete search history.

(56) References Cited

U.S. PATENT DOCUMENTS

| 3,273,630 | A | * | 9/1966 | Kuhnlein | 159/6.1 |
| 3,482,947 | A | * | 12/1969 | Jacobsen et al. | 422/640 |
| 3,752,453 | A | | 8/1973 | Doyne | |
| 4,152,642 | A | * | 5/1979 | Doherty | 324/76.13 |
| 4,183,897 | A | * | 1/1980 | Lanteri | 422/606 |
| 4,452,302 | A | * | 6/1984 | Schoerner | 165/133 |
| 5,250,234 | A | | 10/1993 | Meyer et al. | |
| 5,266,281 | A | * | 11/1993 | Kao et al. | 422/652 |
| 5,445,801 | A | * | 8/1995 | Pisoni | 422/607 |
| 2003/0223925 | A1 | * | 12/2003 | Rostrup-Nielsen et al. | 422/196 |
| 2006/0230680 | A1 | * | 10/2006 | Rostrup-Nielsen et al. | 48/198.3 |
| 2008/0306295 | A1 | | 12/2008 | Aigner et al. | |
| 2008/0306395 | A1 | * | 12/2008 | Xu et al. | 600/509 |

FOREIGN PATENT DOCUMENTS

| DE | 35 26 079 | 1/1987 |
| EP | 1 329 258 | 7/2003 |

OTHER PUBLICATIONS

International Search Report for PCT/EP2008/056584, mailed Nov. 7, 2008.
Hessel, V. et al., "Gas-Liquid and Gas-Liquid-Solid Microstructured Reactors: Contacting Principles and Applications", Ind. Eng. Chem. Research, vol. 44, (Oct. 26, 2005), pp. 9750-9769.

* cited by examiner

*Primary Examiner* — Walter D Griffin
*Assistant Examiner* — Huy-Tram Nguyen
(74) *Attorney, Agent, or Firm* — Nixon & Vanderhye P.C.

(57) ABSTRACT

A tube bundle falling film microreactor for performing gas-liquid reactions, which has: a) at least one vertical tube with b) a device for distributing the liquid on the inside of the tube and c) a liquid collecting system, and d) a device for gas supply and removal, and use thereof.

14 Claims, 4 Drawing Sheets

Overall construction of a falling film tube with the apparatus for distributing the liquid on the inside of the tube, a liquid collecting system, and a device for gas supply and removal Overall construction of a falling film tube with the apparatus for distributing the liquid on the inside of the tube, a liquid collecting system, and a device for gas supply and removal Construction of a tube bundle with top plate (1), bottom plate (2), upper intermediate plate (3), gap (4) for liquid introduction, and upper lid (5), gap (6) for gas introduction, lower intermediate plate (7), collecting system for the liquid (8), gas collecting space (9) and lower lid (10).

TUBE BUNDLE FALLING FILM MICROREACTOR FOR PERFORMING GAS LIQUID REACTIONS

This application is the U.S. national phase of International Application No. PCT/EP2008/056584 filed 29 May 2008, which designated the U.S. and claims priority to AT Application No. A 868/2007 filed 1 Jun. 2007, the entire contents of each of which are hereby incorporated by reference.

FIELD

The present invention relates to a tube bundle falling film microreactor in which the falling film is formed on the inside of the tubes, and to the use thereof for gas-liquid reactions.

BACKGROUND AND SUMMARY

To avoid safety problems in strongly exothermic reactions, the literature proposes performing these reactions in a microreactor. In microreactors, these reactions are easier to control than in conventional batch reactors or continuous reactors. In addition, it is possible in the microreactor to achieve reaction conditions which are not achievable for safety reasons using conventional methods in the laboratory or on the industrial scale.

Reactions which can lead to safety problems are, for example, gas-liquid reactions, for instance catalytic hydrogenations, oxidations, for instance ozonolysis, halogenation with gaseous chlorine or fluorine, alkoxylations with gaseous epoxides, addition of hydrogen halides onto double bonds, phosgenations, acidic esterifications, for example with isobutene; or reactions with ammonia.

Microreactors for gas-liquid reactors are, for example, those with continuous phase flow, for instance a falling film microabsorber, and are supplied by various manufacturers on the laboratory scale.

Falling film microabsorbers are based on the principle of the wetting of surfaces or of flat microstructured plates by a liquid film under the influence of gravity. The gas can be conducted over the falling liquid film either in cocurrent or in countercurrent. The falling film plates are cooled from the reverse side, which enables exact temperature control and removal of heat or cold.

A falling film microabsorber as used to date according to the prior art is described, for example, in Ind. Eng. Chem. Res., Vol. 44, No. 25, 2005, page 9751.

This reactor design is enlarged to the pilot scale by arranging many flat plates to form a stack with a common distributor and collector system.

However, the principle of the plate stack brings numerous disadvantages. For example, the manufacture of the plate stack by the required bonding, for example by soldering, welding, adhesive bonding, etc., of the individual plates is complicated and costly. Moreover, this design does not enable effective pressure release.

However, the principle of the plate stack brings numerous disadvantages. For example, the manufacture of the plate stack by the required bonding, for example by soldering, welding, adhesive bonding, etc., of the individual plates is complicated and costly. Moreover, this design does not enable effective pressure release. The apparatus is additionally not dismantleable, for example for cleaning, inspection or for refitting, and the enlargeability to the production scale is limited.

A further variant of a falling film microreactor is the cylindrical falling film microreactor, in which the falling film is generated on the outside of an individual tube.

A disadvantage in this system is the large common gas space around the tubes, which constitutes a safety problem. The arrangement as a falling film tube wetted on the outside causes, moreover, a high level of construction complexity, both for the individual tube and for the arrangement of a plurality of tubes, which limits the enlargeability to the production scale.

It was therefore an object of the present invention to find an improved means of performing gas-liquid reactions in a microreactor, which avoids the disadvantages of falling film microreactors according to the prior art used to date.

Unexpectedly, this object is achieved by the utilization of the principles of microstructured gas-liquid falling film reactors in combination with designs of tube bundle heat exchangers using tubes wetted on the inside instead of flat plates or tubes wetted on the outside.

The present invention therefore provides a tube bundle falling film microreactor for performing gas-liquid reactions, which has
a) at least one vertical falling film tube with
b) a device for distributing the liquid on the inside of the tube and
c) a liquid collecting system, and
d) a device for gas supply and removal.

DETAILED DESCRIPTION

The inventive tube bundle falling film microreactor has at least one vertical falling film tube.

In analogy to the construction of an upright tube bundle heat exchanger, the falling film tube can be duplicated by arranging many of the vertical individual tubes as a bundle in a common jacket casing, which greatly simplifies the enlargement to a production reactor.

The maximum number of tubes is 1000; preferably from 5 to 500 and more preferably from 10 to 300 vertical falling film tubes are combined as a bundle in a common casing.

The tubes have an internal diameter of from 0.5 to 100 mm, preferably from 5 to 50 mm and more preferably from 10 to 30 mm. The length of the tubes is from 100 to 1000 mm, preferably from 200 to 800 mm and more preferably from 250 to 550 mm.

Suitable materials for the falling film tubes are metals, for instance steels such as 1.4571, Hastelloy and the like, or generally metals which behave inertly toward the reaction media. However, glass, silicon carbide or chemically inert plastics are also suitable for use as the falling-film tube. The most important properties are chemical inertness toward the reaction media, sufficient rigidity under pressure, sufficient thermal conductivity to ensure temperature control, good wettability with the liquid reaction medium and sufficiently easy processibility.

Preference is given to using metals inert toward the reaction media, particular preference to using steels, for instance 1.4571.

On the upper part of each individual tube is disposed a device for distributing the liquid on the inside thereof.

This device has the task of ensuring that the falling liquid film which is applied on the upper part of the tube over the full circumference runs downward as a result of gravity, such that the entire inner surface of the tube is wetted with liquid.

This device may, for example, be a gap, an overflow edge or a distributor system with a small structure. In this distributor system, a correspondingly high pressure drop forces both the formation of a uniform liquid film over the entire circumference of the tube and the equal distribution of the liquid between the individual tubes.

Preference is given to a gap.

Figure 1:
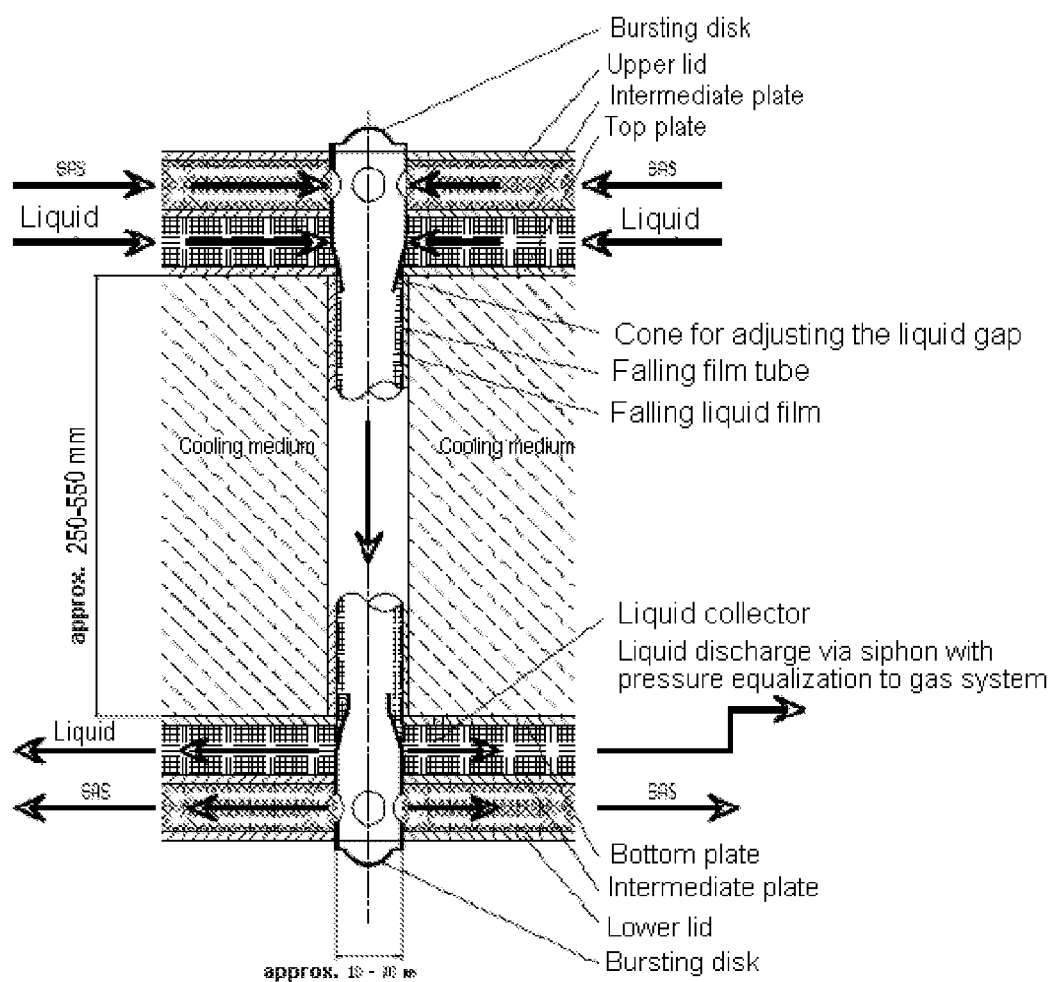
FIG. 1 is a cross-sectional view of one embodiment of an overall construction of a falling film tube with an apparatus for distributing the liquid on the inside of the tube, a liquid collecting system and a device for gas supply and removal.

A gap can, for example, be formed by a cone, which, as shown, for instance, in FIG. 1, is placed onto the tube. The cone is fixed in a guide by means of a screw. Screwing the cone higher or lower allows the width of the gap through which the liquid is passed into the tube to be varied. This allows the pressure drop of the gap and consequently the amount of liquid applied to the individual tube to be varied in a simple manner. This system also facilitates the adjustment to various reaction systems and has a high versatility.

The liquid throughput is adjusted to the requirements of the reaction system used according to the desired throughput and conversion.

At the lower end of the tube is likewise disposed such a cone, by means of which the liquid is removed, and a liquid collecting system. This liquid collecting system consists of a collecting vessel in the form of a ring or shell and a line, preferably a siphon line, by means of which the liquid is drawn off (see FIG. 1).

The gas is supplied and removed in each case via bores or orifices in the upper and lower cone.

Gas and liquid are distributed and collected in each case by means of a separate entrance and exit, such that the two phases are completely separated from one another outside the falling film tubes.

Between the liquid outlet or discharge and the gas system, a pressure equalization is additionally incorporated, in order to prevent the overflow of the liquid in the event of varying gas pressure. This can be effected, for example, by means of a simple capillary line.

The reaction gas is conducted within the interior of the tube either in cocurrent or in countercurrent. Preference is given to conducting the gas in cocurrent.

Flame barriers are preferably also incorporated, more preferably in the feed lines and draw lines for reaction liquid and gas for the individual tube or for the arrangement of individual tubes.

The inventive overall construction of a falling film tube comprising the device for distributing the liquid on the inside of the tube, a liquid collecting system, and a device for gas supply and removal is shown, for example, in FIG. 1. In this case, the gas is conducted in cocurrent.

The falling film tube is fixed by means of a top plate and a bottom plate. Above the top plate is disposed an upper intermediate plate at a distance of from 1 to 10 mm, which forms a gap. The intermediate plate is fixed preferably by means of spacers and/or elevated elements on the top plate.

The liquid is introduced into the gap and is then distributed on the inside of all individual tubes by means of the device for distributing the liquid (the cone). Above the intermediate plate is in turn mounted, at a distance of from 1 to 10 mm, an upper lid, which again forms a gap. The gas is introduced into this gap and then passes through the bores or orifices in the cone into the interior of the tube.

Between the bottom plate and a lower intermediate plate is disposed the collecting system for the liquid. The gas leaving is removed in a separate gas collecting space which is disposed between the lower intermediate plate and a lower lid.

Figure 2:
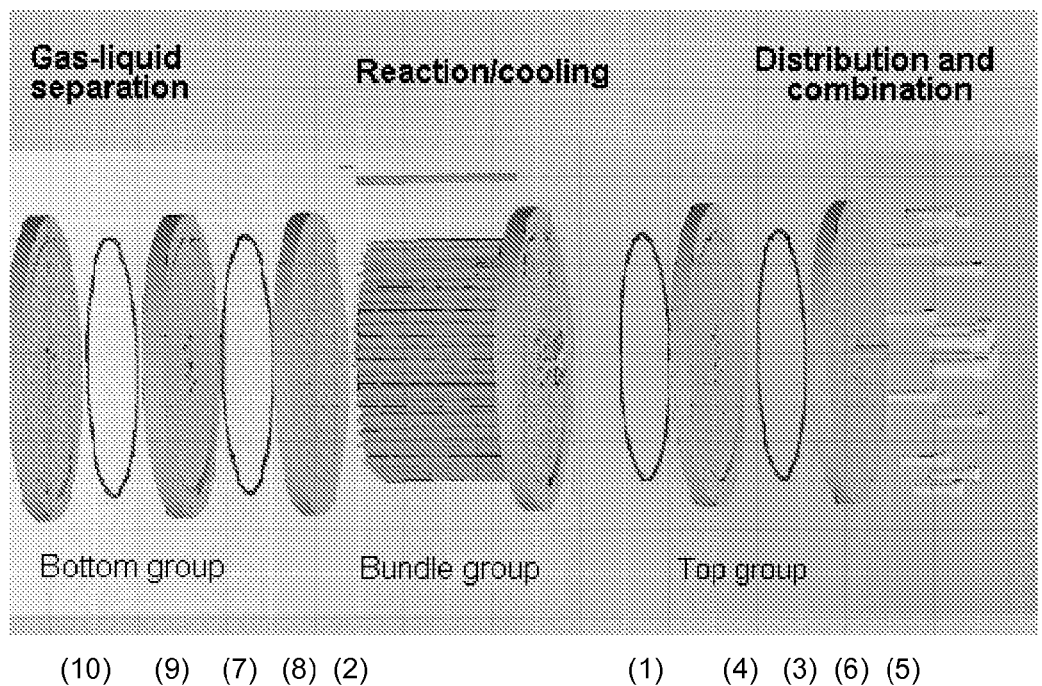
FIG. 2 is an exploded perspective view of a tube bundle.

FIG. 2 shows the structure of a tube bundle, in which the gas is likewise conducted in cocurrent. The construction of the tube bundle is analogous to the individual tube comprising top plate (1), bottom plate (2), upper intermediate plate (3) and gap (4), and upper lid (5), gap (6), lower intermediate plate (7), collecting system for the liquid (8), gas collecting space (9) and lower lid (10).

The liquid is introduced into the gap (4) and is then distributed on the inside of all individual tubes by means of the top plate and the apparatus for distributing the liquid disposed on each tube.

The gas is introduced into the gap (6).

The temperature of the tubes is controlled by means of a cooling medium from the outside. The cooling medium is supplied and removed as in conventional tube bundle heat exchangers by appropriate flow control.

Appropriate configuration of the inside of the tube and/or use of random packings allows the surface which is active in terms of the reaction and safety to be enlarged further or the surface/volume ratio to be controlled.

The inside of the tube may have either conventional microstructures or alternative surfaces.

Conventional microstructures are present in ordered form according to the prior art and have, for example, the form of microchannels which, depending on the sheet material for the reaction, the desired dimensions and geometric ratios, can be obtained by different production methods, for instance anisotropic wet etching of microcrystalline materials, the dry etching method, the LIGA method, etc.

Alternative surface structures can be obtained by very simple processing methods, for example by sanding by hand with sandpaper, but alternatively also by material-removing processing techniques, for example by machining, engraving, dry or wet grinding, brushing, sandblasting, shotblasting or the action of glass beads. However, the structuring can also be effected by laser engraving, etching or pickling.

The tubes preferably have an alternative surface structure which is obtained, for example, by means of sandblasting or grinding.

In a preferred embodiment of the inventive microreactor, the falling film tubes contain random packings for reducing the gas space.

Suitable random packings are different geometries, preferably composed of a metal inert toward the reaction media, which is then inserted into the falling film tubes, which generates an additional metal surface and alters the safety behavior of the individual tube by reducing the free gas volume.

Figure 3:
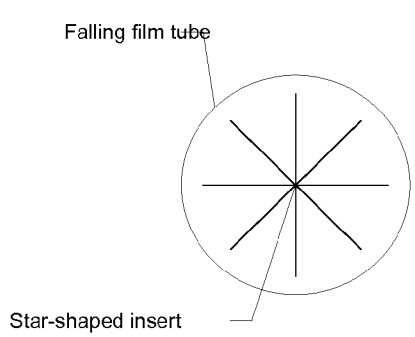
FIGS. 3 and 4 are schematic plan views of insert geometries that may be employed in the falling film tube to reduce gas space.

One possibility is a star-shaped insert which is in contact only with the gas space and is not wetted by the falling film (FIG. 3). The advantage of this insert is the alteration of the safety behavior in the gas space. This insert can be produced from metal by welding, soldering or other joining techniques; preference is given to the use of semifinished parts from continuous casting processes.

Another possibility is an insert which both has contact with the gas space and is wetted by the liquid. Such an insert consists, for example, of rolled sheets which have been welded or soldered together or bonded by other joining techniques.

Figure 4:
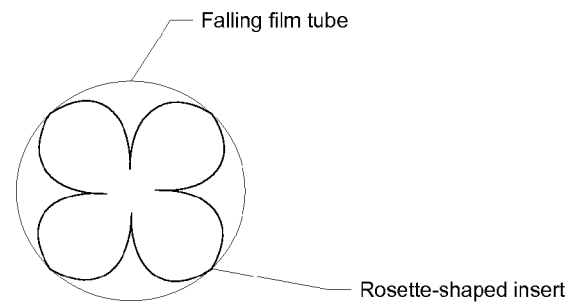

(FIG. 4, rosette-shaped insert). This kind of insert forms additional ribs in the tube interior. The advantage of this insert is the enlarged wetted surface area, on which gas-liquid reactions desired in the falling film can proceed.

The random packings used may also be tubes closed at both ends, which can then be used additionally to cool the apparatus (cooling from inside). These hollow bodies can also be wetted with a liquid film, such that two falling films (inside of the outer tube and outside of the hollow body) are generated in each individual tube and a significantly enlarged reaction surface is available.

Figure 5:
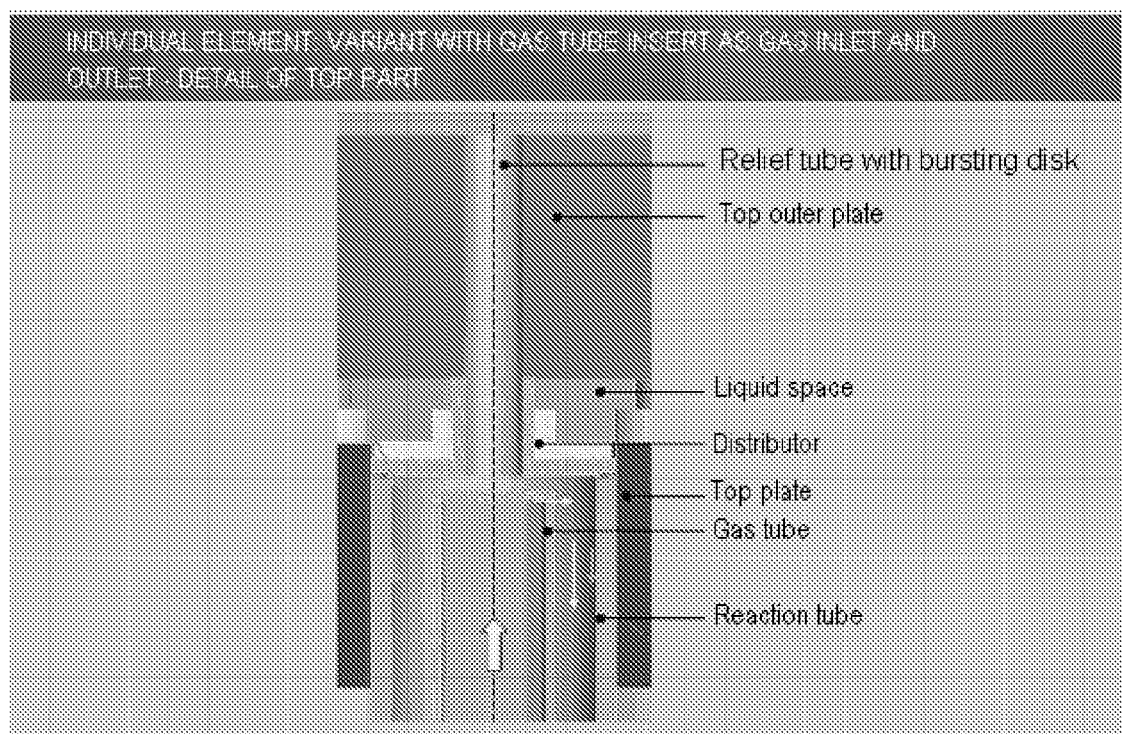
FIGS. 5 and 6 are detailed views of the top and bottom parts of an individual element variant with gas tube insert as the gas inlet and outlet.
Figure 6:
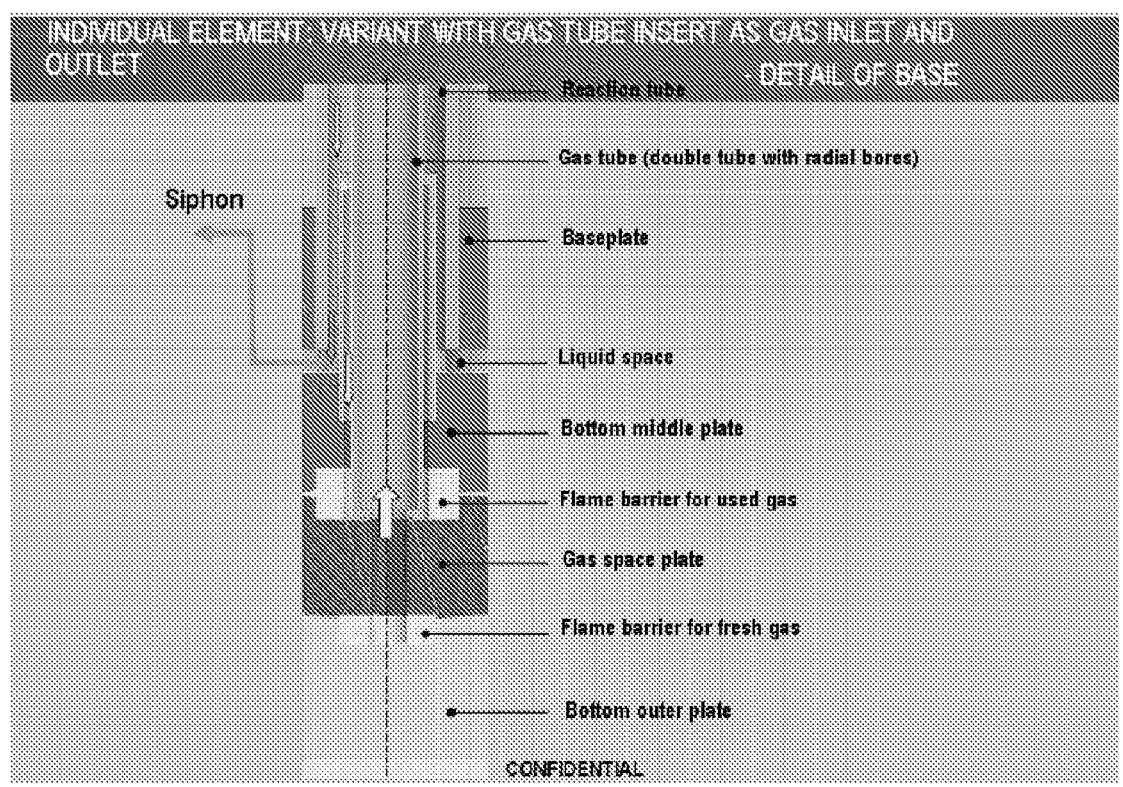

When the gas space insert used is a double tube with radial bores, this can also be used simultaneously for gas supply and removal (see FIGS. 5 and 6).

Both at the upper end and at the lower end of the distributor or collector system, bursting disks for pressure relief may additionally also be mounted.

Constituents (b), (c) and (d), and also the gas inserts, may be manufactured from the same material as the falling film tube. For these parts too, preference is given to using metals inert toward the reaction media, more preferably steels.

The inventive tube bundle falling film microreactor is notable in that easier manufacture is enabled through use of a widespread construction principle in analogy to the tube bundle heat exchanger.

Moreover, relief orifices for explosion purposes (bursting disks) for each individual element can be mounted (in contrast to the plate stack). A further advantage is the best possible decoupling of the individual elements from one another by avoiding a common gas space, and also higher pressure resistance by virtue of cylindrical shape instead of flat plates.

The dismantleability, cleanability and inspectability by virtue of the modular design is likewise very advantageous.

Furthermore, there is high flexibility in the exchange of distributor/collector system or tube bundle for adjustment to specific process requirements.

The inventive tube bundle falling film microreactor is used for gas-liquid reactions.

Gas-liquid reactions are catalytic or noncatalytic hydrogenations, oxidations, for instance ozonolysis; halogenation with gaseous chlorine or fluorine, alkoxylations with gaseous epoxides, addition of hydrogen halides onto double bonds, phosgenations, acidic esterifications, for example with isobutene; or reactions with ammonia.

Preference is given to using the inventive tube bundle falling film microreactor in oxidations, more preferably in ozonolysis processes.

In this case, the reaction liquid which comprises the appropriate reactant is applied to the tubes by the distributor system, as a result of which the falling liquid film which is applied over the full circumference on the upper part of the tube runs downward as a result of gravity, such that the entire inner surface of the tube is wetted with liquid.

At the same time, the reaction gas is introduced into each individual falling film tube via a separate feed line either in cocurrent or in countercurrent, which causes the desired reaction.

At the lower end of the falling film tube, the reaction liquid which now comprises the desired product and unconverted reactant is then collected by means of the collecting system and passed on to the workup by means of a line, preferably a siphon line.

The field of use of the reactor design (temperature, pressure, reactants) is in principle limited only by the stability of the materials used. In the case of use of combustible reactants, however, a temperature range of −50° C. to +100° C. and a pressure range of 0.1-10 bar are selected. In the case of use of combustible solvents, the target temperature is preferably below the flashpoint of the reaction solution and the target pressure is 1-7 bar.

The invention claimed is:

1. A tube bundle falling film microreactor for performing gas-liquid reactions, comprising:
 a) at least one vertical falling film tube having upper and lower cones respectively mounted at upper and lower ends of the tube,
 b) a device for distributing the liquid on an inside of the tube,
 c) a liquid collecting system, and
 d) a device for gas supply and removal.

2. The tube bundle falling film microreactor as claimed in claim 1, which comprises a common casing, and no more than 1000 of vertical falling film tubes in the common casing.

3. The tube bundle falling film microreactor as claimed in claim 1, wherein the at least one vertical falling film tube has an internal diameter of from 0.5 to 100 mm and a length of from 100 to 1000 mm.

4. The tube bundle falling film microreactor as claimed in claim 1, wherein the device for distributing the liquid on the inside of the at least one vertical falling film tube is selected from a gap, an overflow edge or a distributor system with a small structure.

5. The tube bundle falling film microreactor as claimed in claim 4, wherein the device for distributing the liquid is a gap which is formed by the cone at the upper end of the falling film tube.

6. The tube bundle falling film microreactor as claimed in claim 5, wherein the upper cone is fixed in a threaded guide to allow a width of the gap to be varied by screwing the upper cone higher or lower relative to the upper end of the tube.

7. The tube bundle falling film microreactor as claimed in claim 1, wherein the liquid collecting system includes a collecting vessel in the form of a ring or shell, and a line by means of which the liquid is drawn off.

8. The tube bundle falling film microreactor as claimed in claim 1, wherein the gas is supplied to and removed from the tube bundle by orifices in the upper and lower cones.

9. The tube bundle falling film microreactor as claimed in claim 1, comprising gas and liquid systems wherein gas and liquid are each respectively distributed and collected via a separate entrance and exit, such that the gas and liquid are completely separated from one another outside the at least one vertical falling film tube, there being a pressure equalization between the exit for the liquid and the gas system.

10. The tube bundle falling film microreactor as claimed in claim 1, wherein the inside of the at least one vertical falling film tube includes microstructures or an alternative surface structure which is obtained by at least one of hand sanding with sandpaper, machining, engraving, dry or wet grinding, brushing, sandblasting, shotblasting, laser engraving, etching or pickling, and the action of glass beads.

11. The tube bundle falling film microreactor as claimed in claim 1, wherein the at least one falling film tube includes random packings for reducing gas space therein.

12. The tube bundle falling film microreactor as claimed in claim 11, wherein the random packings include at least one of a star-shaped insert which is in contact only with the gas space, an insert which both has contact with the gas space and is wetted with the liquid, tubes closed at both ends and a double tube with radial bores.

13. The tube bundle falling film microreactor as claimed in claim 12, wherein the random packings include tubes closed at both ends, and wherein the tubes closed at both ends are used for additional cooling of the microreactor and/or are wetted with a liquid film, such that two falling films are capable of being generated in each individual tube, one on the inside of the falling film tube and one on an outside of the random packings.

14. The tube bundle falling film microreactor as claimed in claim 12, wherein the random packings include a double tube with radial bores which is used simultaneously as a gas inlet and outlet.

* * * * *